(12) United States Patent
Hayes et al.

(10) Patent No.: US 7,644,943 B2
(45) Date of Patent: Jan. 12, 2010

(54) GAS SPRING ASSEMBLY

(75) Inventors: Bradley W. Hayes, Noblesville, IN (US); Pradipta N. Moulik, Carmel, IN (US); Sydney Kelsey, South Bend, IN (US)

(73) Assignee: BFS Diversified Products, LLC

( * ) Notice: Subject to any disclaimer, the term of this patent is extended or adjusted under 35 U.S.C. 154(b) by 0 days.

(21) Appl. No.: 12/122,437

(22) Filed: May 16, 2008

(65) Prior Publication Data

US 2008/0284072 A1    Nov. 20, 2008

Related U.S. Application Data

(60) Provisional application No. 60/930,919, filed on May 18, 2007.

(51) Int. Cl.
*B60G 11/27* (2006.01)

(52) U.S. Cl. .............................. 280/124.157; 280/5.507; 267/64.16

(58) Field of Classification Search ... 267/64.21–64.28, 267/120, 122, 124, 64.16; 280/5.515–6.153, 280/124.13–124.16
See application file for complete search history.

(56) References Cited

U.S. PATENT DOCUMENTS

| 3,168,278 | A |   | 2/1965  | Ogden           |          |
|-----------|---|---|---------|-----------------|----------|
| 4,669,710 | A | * | 6/1987  | Horvat          | 267/64.21 |
| 4,674,767 | A | * | 6/1987  | Kuroki et al.   | 280/5.513 |
| 4,728,120 | A | * | 3/1988  | Buma et al.     | 280/5.519 |
| 4,742,996 | A | * | 5/1988  | Gold            | 267/64.24 |
| 5,071,108 | A |   | 12/1991 | Houghton, Jr.   |          |
| 5,169,129 | A |   | 12/1992 | Hoffman         |          |
| 5,379,980 | A |   | 1/1995  | Houghton, Jr. et al. |    |
| 5,382,006 | A |   | 1/1995  | Arnold          |          |
| 5,628,496 | A | * | 5/1997  | Chamberlin      | 267/64.11 |
| 5,775,677 | A |   | 7/1998  | Englund         |          |
| 5,797,593 | A |   | 8/1998  | Oyaizu          |          |
| 5,954,316 | A |   | 9/1999  | Voss            |          |
| 6,691,989 | B1|   | 2/2004  | Leonard         |          |
| 7,213,799 | B2|   | 5/2007  | Behmenburg et al.|         |
| 7,497,423 | B2| * | 3/2009  | Myers           | 267/64.27 |
| 2003/0173723 | A1| | 9/2003 | Behmenburg et al.|         |

(Continued)

FOREIGN PATENT DOCUMENTS

JP    2006-009945 A    1/2006

(Continued)

OTHER PUBLICATIONS

Vehicle Dynamics Expo 2006 presentation by Gold.

(Continued)

*Primary Examiner*—Christopher P Schwartz
(74) *Attorney, Agent, or Firm*—Thomas R. Kingsbury; Sarah M. Jabbari; Matthew Dugan (57) ABSTRACT

A gas spring assembly that is suitable for use on a vehicle suspension system includes a first end member and a second end member that is spaced from the first end member. A flexible wall is secured between the first and second end members and at least partially defines a first gas chamber therebetween. A confinement at least partially forms a second gas chamber that is in communication with the first gas chamber. A porous flow restrictor is operatively disposed between the gas chambers. A suspension system including such a gas spring assembly as well as a method is also included.

26 Claims, 3 Drawing Sheets

U.S. PATENT DOCUMENTS

| | | |
|---|---|---|
| 2004/0124571 A1 | 7/2004 | Gold et al. |
| 2005/0236781 A1* | 10/2005 | Brookes et al. .......... 280/5.507 |
| 2006/0207846 A1* | 9/2006 | Krauss ....................... 188/314 |
| 2006/0267297 A1* | 11/2006 | Nordmeyer et al. ...... 280/5.515 |
| 2008/0000739 A1 | 1/2008 | Behmenburg et al. |
| 2008/0023931 A1* | 1/2008 | Myers ................. 280/124.157 |
| 2008/0048405 A1* | 2/2008 | DeLorenzis et al. ...... 280/6.159 |
| 2008/0174056 A1* | 7/2008 | Egolf ....................... 267/64.11 |
| 2008/0290617 A1* | 11/2008 | Bounds ....................... 280/5.5 |
| 2008/0315474 A1* | 12/2008 | Koeske et al. ............... 267/220 |

FOREIGN PATENT DOCUMENTS

| | | |
|---|---|---|
| WO | WO 01/001012 A1 | 1/2001 |
| WO | WO 2006/063647 A1 | 6/2006 |

OTHER PUBLICATIONS

Legs and Isolators: Basics of Pneumatic Isolator Design—Conventional vs. Advanced Laminar-Flow Damping. Datasheet [online]. Newport Corporation [retrieved on Jul. 12, 2006] Retrieved from the Internet: <URL:www.newport.com/servicesupport/Tutorials/default.aspx?id=136.

Mott Corporation, *High Purity Porous Metal Flow Restrictors*, 3 pages.

\* cited by examiner

GAS SPRING ASSEMBLY

This application claims priority from U.S. Provisional Patent Application No. 60/930,919 filed on May 18, 2007, which is hereby incorporated herein by reference in its entirety.

BACKGROUND

The present disclosure broadly relates to the art of vehicle suspension systems and, more particularly, to a gas spring assembly suitable for use on a vehicle suspension system. The gas spring assembly includes a porous flow restrictor capable of maintaining laminar gas flow between two gas chambers that are interconnected by the porous flow restrictor.

Vehicle suspension systems typically include a plurality of spring elements for accommodating forces and loads associated with the operation and use of the vehicle. In such vehicle suspension system applications, it is often considered desirable to select spring elements that have the lowest suitable spring rate, as this favorably influences ride quality and comfort. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of the road inputs to the sprung mass and will, thus, provide a more comfortable ride.

With more specific reference to gas springs, it is possible to reduce the spring rate of gas springs, thereby improving ride comfort, by increasing the volume of pressurized gas operatively associated with the gas spring. This is commonly done by placing an additional chamber, cavity or volume filled with pressurized gas into fluid communication with the primary spring chamber of the gas spring, as is well known by those of skill in the art. Such additional volumes can be formed within a component of the gas spring itself, as shown, for example, in U.S. Pat. No. 5,954,316, or provided separately and connected through one or more passages, as shown, for example, in U.S. Pat. No. 6,691,989.

Vehicle suspension systems also commonly include a plurality of dampers or damping elements that are operative to dissipate undesired inputs and movements of the vehicle, particularly during dynamic operation thereof. Typically, such dampers are liquid filled and operatively connected between the sprung and unsprung masses of the vehicle. In other arrangements, however, the damping elements can be of a type and kind that utilize gaseous fluid rather than liquid as the working medium. In such known constructions, the gas damper portion permits gas flow between two or more volumes of pressurized gas, such as through one or more orifices, as shown, for example in U.S. Patent Application Publication No. 2004/0124571 A1, or through one or more valve ports, as shown, for example, in U.S. Patent Application Publication No. 2003/0173723. Generally, there is some resistance to the movement of pressurized gas through these passages or ports, and this resistance acts to dissipate energy associated with the gas spring portion and thereby provide some measure of damping.

Various disadvantages exist with known gas spring constructions that include additional gas volumes to assist in reducing the spring rate of the gas spring, and at least some of these disadvantages involve the movement of air between the two volumes. That is, the flow of pressurized gas between the two volumes is at least partially dependent upon the size, length, shape and number of fluid pathways connecting the two volumes. It will be appreciated that one or more, very large, fluid-communication pathways would permit increased quantities of pressurized gas to flow between the two volumes. However, such pathways would provide reduced resistance to gas flow and, thus, provide minimal damping characteristics. What's more, such very large pathways are often difficult to provide, given the limited operating and mounting envelopes normally associated with vehicle suspension systems.

Increased damping performance can, of course, be provided by reducing the size, increasing the length, altering the shape and/or reducing the number of fluid pathways between the two volumes. However, such alterations would normally provide increased damping performance at the expense of other performance characteristics of the gas spring. That is, the changes that increase the resistance to flow through the passages and, thus, increase damping performance will typically also decrease the effectiveness of the additional gas volume to reduce the spring rate of the gas spring. For example, such alterations can render a pathway more susceptible to choked flow conditions, during which gas flow through the passageway is substantially reduced or even stalled.

Another disadvantage of such known arrangements, is that a pathway, orifice or valve port of a given size is normally only capable of providing damping performance over a relatively small range of frequencies, such as from about ±2.5 Hz to about ±5 Hz. So, for an orifice that is sized to damp a nominal frequency of 10 Hz, a range of frequencies of from about 7.5 Hz to about 12.5 Hz or possibly a range of frequencies as wide as from about 5 Hz to about 15 Hz may be damped. Unfortunately, vibrations associated with the operation and use of a vehicle normally range from very low frequencies, such as from about 0.1 Hz to about 40 Hz, for example, as well as significantly higher frequencies, such as from about 40 Hz to about 100 Hz, for example. Thus, it is often desirable for a vehicle suspension system to attenuate vibrations within a wider range of frequencies, such as from about 0.1 Hz to about 100 Hz, for example, than is normally damped by a gas damper that simply uses one or more orifices. Unfortunately, known gas damping devices are generally incapable of attenuating such a wide range of frequencies of vibration.

Thus, it is desired to develop a gas spring assembly as well as a vehicle suspension system using the same that overcomes the foregoing and other problems and disadvantages associated with known constructions.

BRIEF DESCRIPTION

A gas spring assembly in accordance with the present novel concept for an associated vehicle having an associated unsprung mass and an associated sprung mass is provided. The gas spring assembly includes a first end member that is operatively connected to one of the associated sprung mass and the associated unsprung mass, and a second end member that is spaced from the first end member toward the other of the associated sprung mass and the associated unsprung mass. A flexible wall is secured between the first and second end members and at least partially forms a first gas chamber therebetween. A confinement at least partially defines a second gas chamber. A porous flow restrictor is disposed in fluid communication between the first and second gas chambers. The porous flow restrictor defines a plurality of fluid flow passages that are operative to maintain laminar gas flow under relative displacement between the first and second end members of the gas spring, which displacement generates gas flow between the first and second gas chambers through the porous flow restrictor.

A suspension system in accordance with the present novel concept for an associated vehicle having an associated sprung mass and an associated unsprung mass is provided. The suspension system includes a gas spring assembly that is operatively connected between the associated sprung and unsprung masses. The gas spring assembly includes a first end member, a second end member spaced from the first end member and a flexible wall secured between the first and second end members that at least partially forms a first gas chamber therebetween. A confinement at least partially defines a second gas chamber. A porous flow restrictor is disposed in fluid communication between the first and second gas chambers. The porous flow restrictor defines a plurality of fluid flow passages that are operative to maintain laminar gas flow under relative displacement between the first and second end members of the gas spring, which displacement thereby generates gas flow between the first and second gas chambers through the porous flow restrictor. A pressurized gas source is in fluid communication with one of the first and second gas chambers. A valve assembly is fluidically connected between the pressurized gas source and at least one of the first and second gas chambers. A control system is operative to selectively energize the valve assembly for controlling fluid communication between the pressurized gas source and at least one of the first and second gas chambers.

A gas spring assembly in accordance with the present novel concept is provided that includes a first end member, a second end member spaced from the first end member and a flexible wall secured between the first and second end members that at least partially forms a first gas chamber therebetween. A confinement at least partially defines a second gas chamber. A porous flow restrictor is disposed in fluid communication between the first and second gas chambers. The first end member, the second end member and the flexible wall together forming a gas spring having a spring rate corresponding to the first gas chamber. The spring rate varies as a function of frequency of vibration and has a first resonant frequency. The second gas chamber and the porous flow restrictor are operative to generate a reduced-spring rate region of performance that is substantially frequency independent through a range of frequencies below the first resonant frequency.

A gas spring and gas damper assembly in accordance with the present disclosure is provided for use on an associated vehicle having an associated sprung mass and an associated unsprung mass. The gas spring and gas damper assembly includes a first gas spring assembly that is operatively connected between the associated sprung and unsprung masses. The first gas spring assembly includes a first end member disposed toward the associated sprung mass, a second end member spaced from the first end member toward the associated unsprung mass, and a flexible spring wall secured between the first and second end members that at least partially defines a first gas chamber therebetween. A first gas damper is operatively connected to the gas spring assembly and includes a first confinement that at least partially defines a second gas chamber and a porous flow restrictor disposed in fluid communication between the first and second gas chambers. The porous flow restrictor defines a plurality of fluid flow pathways and is operative to maintain laminar gas flow through the plurality of fluid flow pathways upon movement of the first and second end members relative to one another and to thereby dissipate kinetic energy associated with the gas spring assembly.

A suspension system in accordance with the present disclosure is provide for an associated vehicle having an associated sprung mass and an associated unsprung mass. The suspension system includes a gas spring assembly that is operatively connected between the associated sprung and unsprung masses of the vehicle. The gas spring assembly includes a first end member, a second end member spaced from the first end member, and a flexible spring wall secured between the first and second end members that at least partially forms a first gas chamber therebetween. The suspension system also includes a gas damper that is operatively disposed between the associated sprung and unsprung masses. The gas damper includes a confinement that at least partially defines a second gas chamber, and a porous flow restrictor disposed in fluid communication between the first and second gas chambers for dissipating kinetic energy associated with movement of the suspension system. The porous flow restrictor defines a plurality of fluid flow passages that are operative to maintain laminar gas flow under relative displacement between said first and second end members of the gas spring which generates gas flow between the first and second gas chambers through the porous flow restrictor. A pressurized gas source is in fluid communication with one of the first and second gas chambers. A valve assembly is fluidically connected between the pressurized gas source and one of the first and second gas chambers. A control system is operative to selectively energize the valve assembly for controlling fluid communication between the pressurized gas source and one of the first and second gas chambers.

A method in accordance with the present disclosure of making a gas spring and gas damper suspension system for a vehicle having a sprung mass and an unsprung mass is provided. The method includes disposing a gas filled confinement that has a first gas chamber on the vehicle and disposing a gas spring having a second gas chamber on the vehicle by securing a first portion of the gas spring along the sprung mass and securing a second portion of the gas spring along the unsprung mass of the vehicle. The method also includes forming a passage that fluidically connects the first and second gas chambers. The method further includes disposing a porous flow restrictor in the passage for maintaining laminar gas flow through the porous flow restrictor. The gas flow being due at least in part to relative displacement of the first and second spring portions of the gas spring.

A method in accordance with the present disclosure of operating a suspension system of a vehicle that has a sprung mass and an unsprung mass is provided and includes providing a gas spring assembly operatively supported between the sprung and unsprung masses of the vehicle. The gas spring assembly includes a first gas chamber. The method also includes providing a confinement that at least partially defines a second gas chamber and providing a passage fluidically connecting the first and second gas chambers. The method further includes disposing a porous flow restrictor along the passage between the first and second gas chambers and damping gas flow through the passage using the porous flow restrictor.

DETAILED DESCRIPTION

Figure 1:
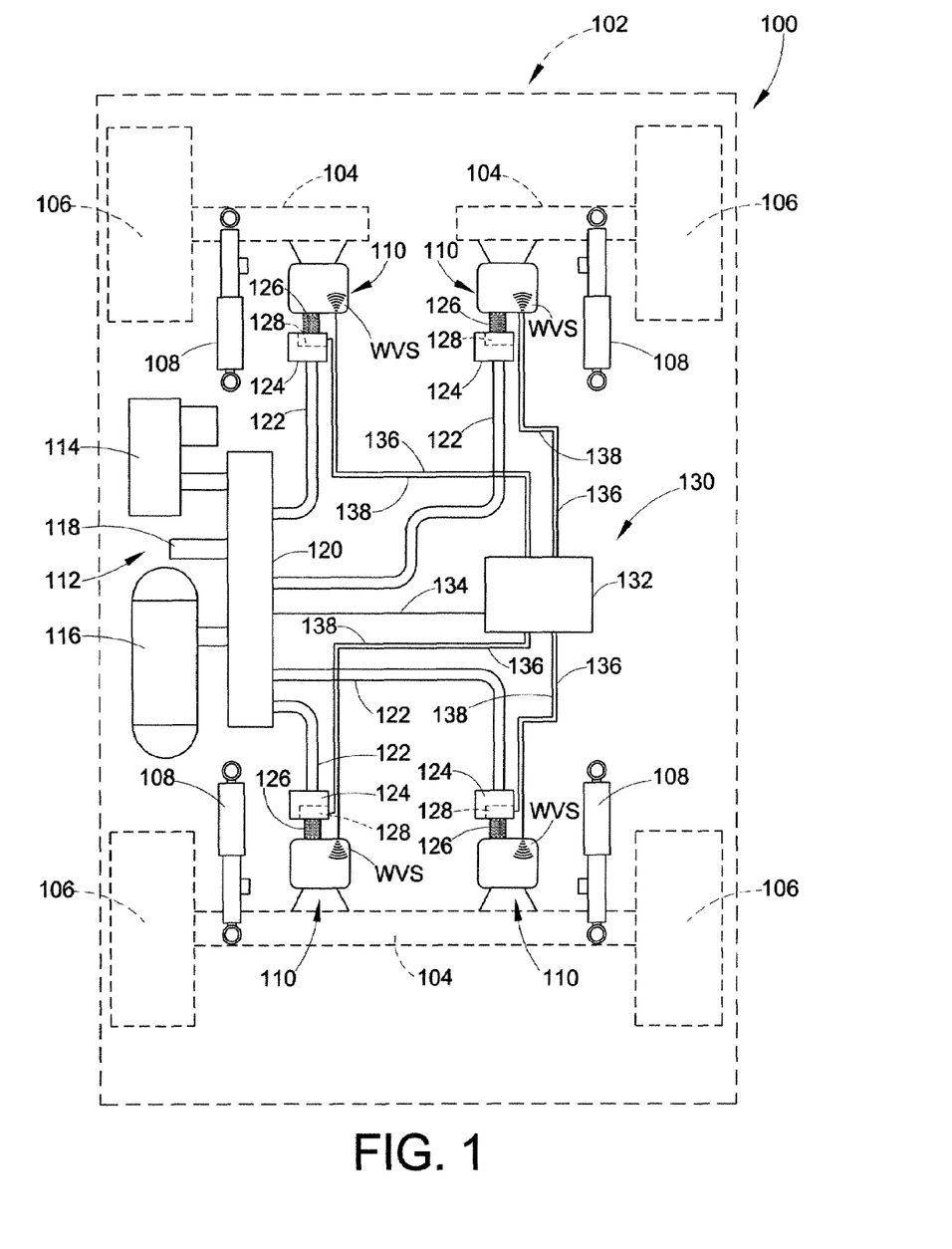
FIG. 1 is a schematic representation of one exemplary embodiment of a vehicle suspension system in accordance with the present disclosure.

Turning now to the drawings wherein the showings are for the purpose of illustrating exemplary embodiments of the present novel concept and not for limiting the same, FIG. 1 illustrates a vehicle 100 having a sprung mass, such as a vehicle body 102, for example, and an unsprung mass, such as axles 104 and/or wheels 106, for example. Additionally, plurality of liquid damping members, such as shock absorbers 108, for example, can be secured between the sprung and unsprung masses of the vehicle in a suitable manner. It will be appreciated, however, that such damping members are optionally included in the exemplary embodiment in FIG. 1. Additionally, a plurality of gas spring assemblies 110 (which may also be referred to herein as "gas spring and gas damper assemblies") are disposed between the sprung and unsprung masses of the vehicle, such as adjacent wheels 106 and shock absorbers 108 as shown in FIG. 1, for example.

Vehicle 100 also includes a pressurized gas system 112 that is in communication with gas spring assemblies 110 and that is operative to selectively supply pressurized gas thereto and exhaust pressurized gas therefrom. Pressurized gas system 112 includes a pressurized gas source, such as a compressor 114, and can optionally include a storage vessel, such as a reservoir 116, for example, for receiving and storing pressurized gas, such as may be generated by the pressurized gas source. System 112 can further include a suitable exhaust, such as a muffler 118, for example, for venting pressurized gas from the system.

Pressurized gas system 112 can be in communication with the gas spring assemblies in any suitable manner. For example, system 112 can include a valve assembly 120 or other suitable device or arrangement for selectively distributing pressurized gas to, from and/or between the pressurized gas source or sources, the exhaust and/or the gas spring assemblies. As shown in the exemplary embodiment in FIG. 1, compressor 114, reservoir 116 and muffler 118 are in fluid communication with valve assembly 120 and can be selectively placed in fluid communication with one another therethrough. Additionally, assemblies 110 are in fluid communication with valve assembly 120 via transmission lines 122 and, thus, can be selectively placed in communication with the compressor, reservoir muffler and/or one another therethrough.

It will be appreciated that gas spring assemblies 110 can take any suitable form, configuration and/or construction in accordance with the present novel concept. In the embodiment shown in FIG. 1, each assembly 110 includes a confinement 124 in communication with transmission line 122 and a porous flow restrictor 126 disposed in communication between the confinement and the gas spring assembly. Additionally, one or more valve assemblies or other suitable gas-flow controlling devices can optionally be placed in fluid communication between an assembly (e.g., one of assemblies 110) and an associated confinement (e.g., a respective one of confinements 124) for selectively controlling gas flow therebetween through an associated porous flow restrictor (e.g., a respective one of restrictors 126). In the exemplary embodiment shown in FIG. 1, a valve assembly 128 is shown as being disposed within each confinement 124. It will be appreciated, however, that any other suitable arrangement, configuration and/or construction can alternately be used.

In operation of the exemplary embodiment shown in FIG. 1, valve assembly 120 can be selectively actuated to transfer pressurized gas from the compressor and/or reservoir to one or more of the gas spring assemblies via the confinements and porous flow restrictors. Additionally, valve assembly 120 can be selectively actuated to exhaust pressurized gas from one or more of the gas spring assemblies by way of muffler 118 or another suitable arrangement. It will be appreciated that the foregoing pressurized gas system and operation thereof are merely exemplary and that any other suitable pressurized gas source, system and/or method of operation in accordance with the present novel concept could alternately be used.

Vehicle 100 also includes a control system 130 for selectively operating, adjusting or otherwise influencing or controlling the performance or one or more suspension system components, such as gas spring assemblies 110 and/or pressurized gas system 112, for example. Control system 130 includes an electronic control unit 132 in communication with one or more components of valve assembly 120, such as through a communication line 134, for example, for selective actuation and/or operation thereof. Electronic control unit 132 is also shown in FIG. 1 as being in communication with suitable height sensing devices (not shown in FIG. 1) that are used in association with gas spring assemblies 110. It will be appreciated that such communications can be implemented in any suitable manner, such as by way of communication lines 136, for example. Additionally, it will be appreciated that height sensors or any other distance-determining devices of any suitable type, kind, construction and/or configuration can be used, such as mechanical linkage sensors, ultrasonic wave sensors or electromagnetic wave sensors utilizing waves WVS, for example.

Figure 2:
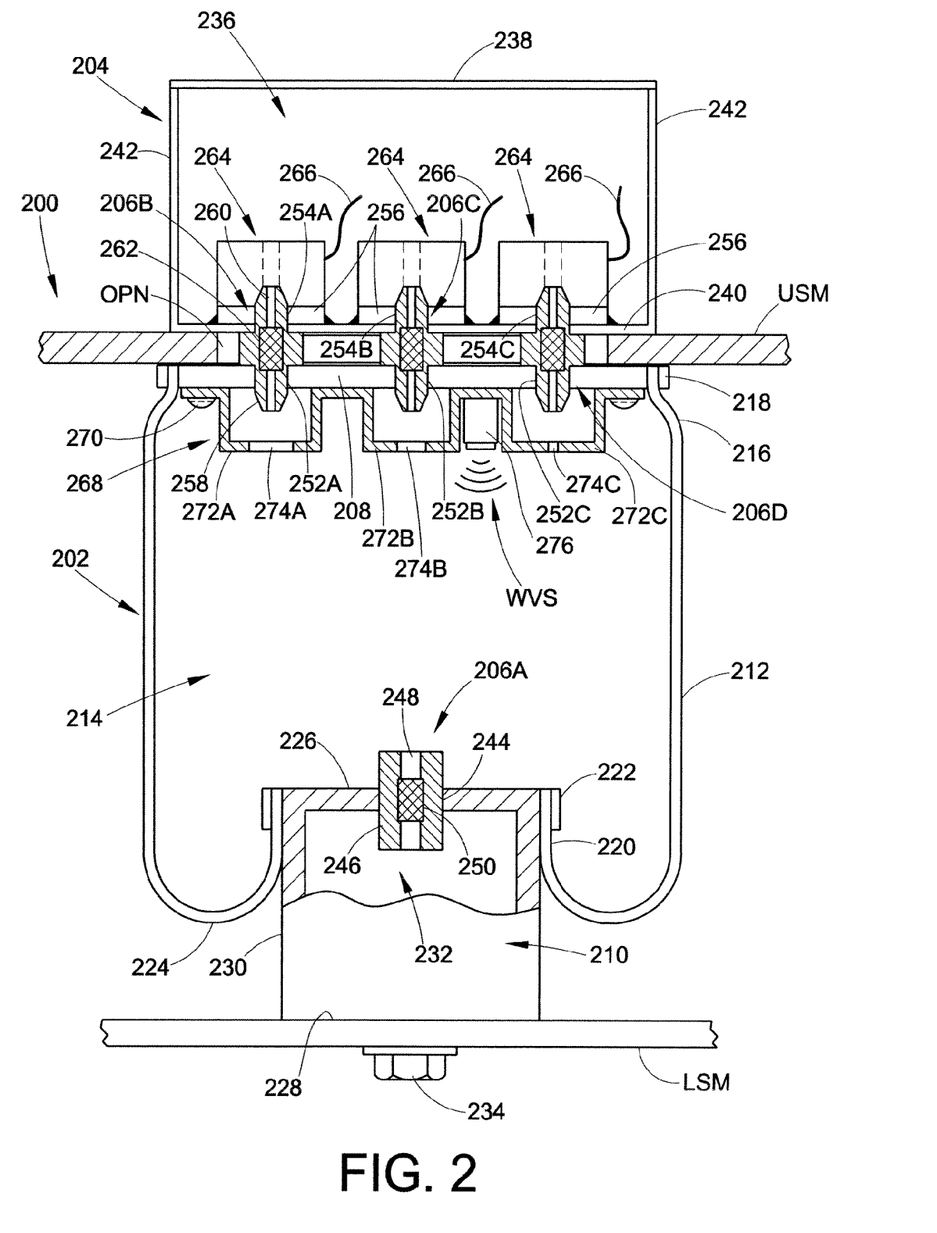
FIG. 2 is a cross-sectional side view of one exemplary embodiment of a gas spring assembly in accordance with the present disclosure.

Referring to FIG. 2, one exemplary embodiment of a gas spring assembly (which may also be referred to herein as a "gas spring and gas damper assembly"), such as may be suitable for use as shown in FIG. 1, for example, is indicated generally at 200 and includes a gas spring portion, a confinement and at least one porous flow restrictor fluidically disposed therebetween. In the exemplary embodiment shown in FIG. 2, a gas spring portion 202 is shown as being disposed between a first or upper structural member USM, such as a body of a vehicle, for example, and a second or lower structural member LSM, such as an axle or other wheel-engaging member of a vehicle, for example. Additionally, the exemplary embodiment in FIG. 2 includes a confinement 204 and a plurality of porous flow restrictors 206A-D in operative communication with the gas spring portion.

Gas spring portion 202 of assembly 200 includes a first or upper end member 208 disposed along upper structural member USM, a second or lower end member 210 disposed along lower structural member LSM, and a flexible spring wall 212 that is secured therebetween and at least partially defines a first gas or spring chamber 214. Gas spring portion 202 is shown in FIG. 2 as being of a rolling-lobe type construction. However, it will be appreciated that any other suitable type, kind, configuration and/or construction of gas spring can alternately be used, such as convoluted bellows-type gas springs, for example.

In the exemplary embodiment shown in FIG. 2, a first open end 216 of spring wall 212 is secured on first end member 208 using a swage or retaining ring 218. Similarly, an opposing, second open end 220 of spring wall 212 is secured on second end member 210 using a swage or retaining ring 222. It will be appreciated, however, that any other suitable type, kind and/or or configuration of end members and/or connection arrangements can be used in forming either or both ends of the gas spring portion. In the exemplary embodiment shown in FIG.

2, second end member 210, which is commonly referred to in the art as a piston, operates in conjunction with a lobe portion 224 of flexible wall 212. Second end member or piston 210 includes a first or upper end wall 226, an opposing second or lower wall 228 disposed along lower structural member LSM, and a side wall 230 that extends therebetween.

In some known constructions, a piston-type end member will include or at least partially define a second volume or chamber, and in some arrangements this second volume or chamber is in fluid communication with the first or spring chamber. For example, in the exemplary embodiment shown in FIG. 2, end walls 226 and 228 together with side wall 230 define a second gas chamber 232. As such, in one exemplary embodiment of the present novel concept, piston 210 can operate as both a second end member and a confinement that at least partially defines a second gas chamber. It will be appreciated, however, that in other exemplary implementations such a second gas chamber, that is at least partially formed within the second end member or piston, will be optional, such as, for example, where the additional gas chamber is otherwise provided, such as is discussed below, for example. Additionally, it will be appreciated that any such second gas chamber, if provided, can be of any suitable size, shape, construction and/or configuration. Furthermore, second end member 210 is shown as being secured to lower structural member LSM using a fastener 234. It will be appreciated, however, that any other suitable mounting or securement arrangement can alternately be used.

Confinement 204 is shown in FIG. 2 as defining a third gas chamber 236, which can be optional in implementations of the present novel concept in which an additional gas chamber other than spring chamber 214 is provided (e.g., second spring chamber 232). Additionally, it will be appreciated that confinement 204 and third gas chamber 236 thereof can be of any suitable size, shape, configuration and/or construction. As shown in the exemplary embodiment in FIG. 2, confinement 204 includes opposing first and second end walls 238 and 240 with one or more side walls 242 extending therebetween that together at least partially define third gas chamber 236. Confinement 204 is shown in FIG. 2 as being supported on upper structural member USM, though it will be appreciated that any suitable support or mounting arrangement can alternately be used.

First and second gas chambers 214 and 232 can be in communication with one another such that pressurized gas therein can flow therebetween, such as in response to relative movement of the end members of the gas spring portion, for example. As such, one or more passages 244 (only one of which is shown in FIG. 2) can be formed through upper end wall 226 such that the first and second gas chambers are in fluid communication with one another. A porous flow restrictor 206A is disposed within passage 244 and is operative to promote laminar gas flow during the transfer of gas between the first and second gas chambers. Porous flow restrictor 206A includes a housing 246, a housing passage 248 extending therethrough, and a porous restrictor element 250 retained within the housing along the housing passage. Housing 246 of porous flow restrictor 206A can include any suitable mounting or securement features (not shown) for retaining the housing on the upper end wall of the second end member.

Additionally, or in the alternative, first and third gas chambers 214 and 236 can be in communication with one another such that pressurized gas therein can flow therebetween, such as in response to relative movement of the end members of the gas spring portion, for example. As such, one or more passages 252 are shown as being formed through upper end member 208. One or more corresponding passages 254 are shown as being formed through second or lower end wall 240 of confinement 204. In FIG. 2, three passages 252A-C extend through the upper end member and three corresponding passages 254A-C extend through the lower end wall of the confinement. In the exemplary embodiment shown, passages 254 also extend through threaded mounting nuts 256 that are secured along second end wall 240 of confinement 204.

Porous flow restrictors 206B-D are disposed between the first and third gas chambers respectively along passages 252A-C and 254A-C and are operative to promote laminar gas flow during transfer of gas between the first and third gas chambers. While it will be appreciated that any number of one or more of porous flow restrictors 206B-D can be used, each of porous flow restrictors 206B-D includes a housing 258, a housing passage 260 extending through the housing, and a porous restrictor element 262 retained within the housing along the housing passage. Porous flow restrictors 206B-D can be secured on and between the first and third gas chambers in any suitable manner, such as by using threaded passages and/or securement nuts engaging threaded portions (not shown) of housings 258, for example. Additionally, upper structural member USM is shown in FIG. 2 as including an opening OPN through which porous flow restrictors 206B-D can pass. It will be appreciated, however, that any other suitable arrangement can alternately be used.

A gas spring assembly in accordance with the present novel concept can also optionally include a valve assembly or other suitable flow controlling device operatively disposed in communication between the first and second gas chambers and/or first and third gas chambers for selectively permitting the transfer of gas therebetween. In the exemplary embodiment shown in FIG. 2, gas spring assembly 200 includes optional valve assemblies 264, which are operatively disposed in communication with housing passages 260 and in a serial arrangement therewith. The valve assemblies can be selectively operated in any suitable manner, such as through an ECU (e.g., ECU 132 in FIG. 1) by way of conductive leads 266, for example, to selectively permit transfer of gas through the associated housing passages.

A gas spring assembly in accordance with the present novel concept can also optionally include a wall or other suitable structure having one or more orifices suitable for targeting a range of frequencies of gas flow between the first and second and/or first and third gas chambers. In the exemplary embodiment shown in FIG. 2, gas spring assembly 200 includes an optional wall structure 268, which can be disposed, provided or secured thereon in any suitable manner, such as by using fasteners 270, for example. As shown, wall structure 268 includes three discrete wall portions 272A-C that each includes an orifice 274A-C. As can be observed in FIG. 2, orifices 274A-C are operatively disposed in serial communication with housing passages 260 of porous flow restrictors 206B-D. Additionally, it can be recognized from FIG. 2 that each of the orifices in wall portions 272A-C are of a different size and are, thus, capable of targeting different ranges of frequencies of gas flow.

As discussed above, porous flow restrictors 126 and 206 can be of any suitable type, kind, configuration and/or construction capable of defining or otherwise providing a plurality (e.g., several hundred to many thousand) of relatively small passages or fluid flow pathways that are operative to maintain laminar properties of gas flowing therethrough. Additionally, it will be appreciated that porous restrictor elements, such as elements 250 and 262, for example, can be of any suitable type, kind and/or configuration as well as being formed of any suitable material (e.g., metal, ceramic or plastic) or construction. In one exemplary embodiment, one or more of the elements is formed from metal in a known manner capable of maintaining laminar flow therethrough, such as by sintering relatively small metal pellets, for example. In one exemplary embodiment, the porous restrictor element can be formed from one of stainless steel, a nickel alloy, a nickel-molybdenum alloy or any combination thereof. However, it will be understood that other materials can be used as may be suitable for use in any anticipated environment and under any anticipated conditions, such as having adequate corrosion resistance and properties for use in an under-vehicle environment, for example. One example of commercially available porous flow restrictors that are suitable for use in practicing the present novel concept can be obtained from Mott Corporation of Farmington, Conn.

A gas spring and gas damper in accordance with the present novel concept can optionally include any further components or features as may be desired and/or useful. For example, a distance sensing device 276 can be supported on gas spring portion 202 within spring chamber 214 in any suitable manner. Such a distance sensing device can be operative to generate a signal indicative of a sensed distance, such as by utilizing ultrasonic or electromagnetic waves WVS, for example. Any such signal or signals generated or otherwise output by sensing device 276 can be communicated to a suitable component and/or system, such as ECU 132 in FIG. 1, for example, in a suitable manner, such as by way of communication leads 136 in FIG. 1, for example.

In use, a differential pressure is developed between two or more of the gas chambers of a gas spring assembly due to the relative movement of the opposing end members of the gas spring portion. Such movement is normally due to the relative displacement of the sprung and unsprung masses of the vehicle during dynamic operation thereof. However, it will be appreciated that in other applications and environments of use such movement may be due to the relative displacement of other structural components. The differential pressure between the gas chambers causes gas to flow from the gas chamber at the higher relative pressure to the gas chamber at the lower relative pressure. By providing a porous flow restrictor in fluid communication between the two gas chambers, it is expected that laminar gas flow can be maintained over a wide range of operating conditions thereby resulting in improved performance of the gas spring assembly.

Figure 3:
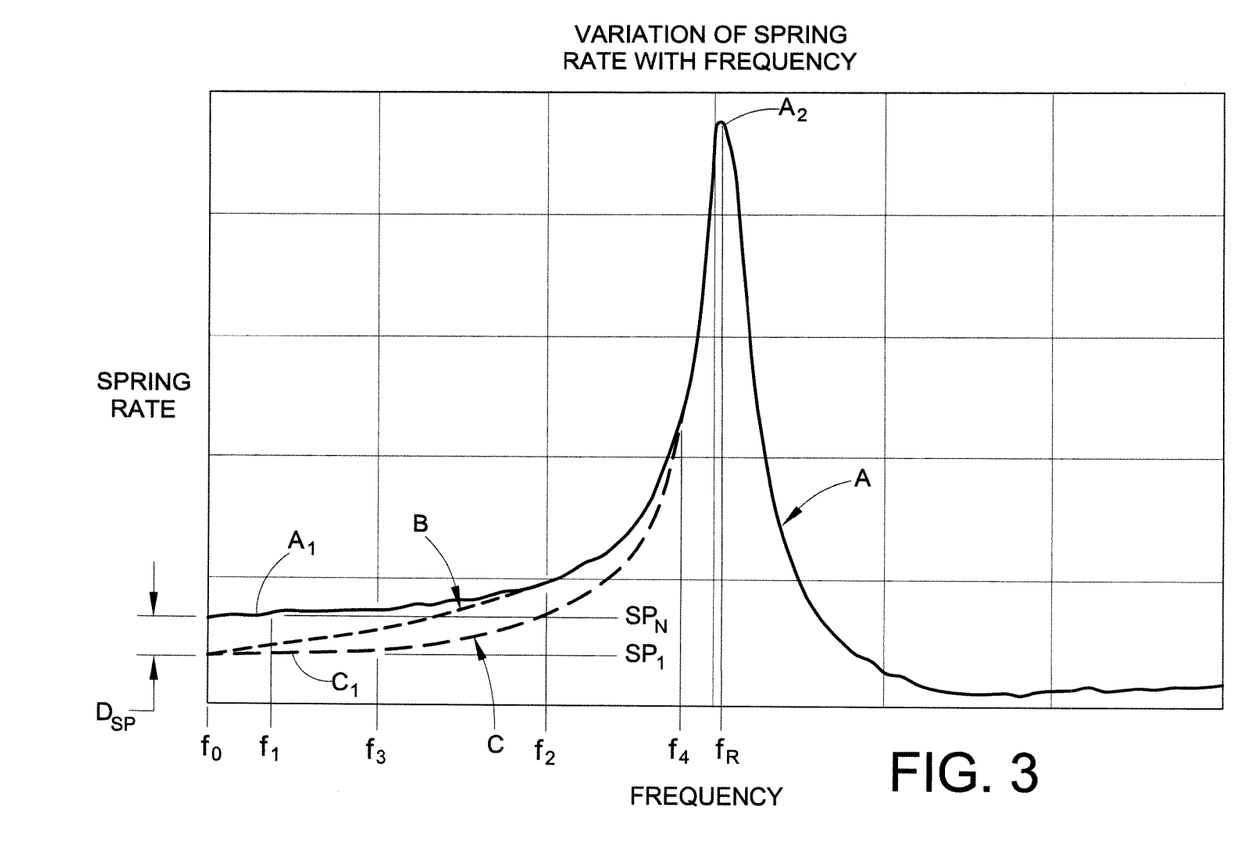
FIG. 3 is a graphical representation illustrating variations in spring rate of a gas spring with respect to frequency of vibration.

One aspect of such improved performance of the gas spring assembly is illustrated in FIG. 3, which presents graphical representations of spring rate versus frequency of vibration for several gas spring configurations. Curve A represents spring rate versus frequency of vibration for a conventional gas spring having no additional confinement or volume of pressurized gas (i.e., a standard gas spring assembly). Curve B represents the expected or otherwise generally accepted performance of a gas spring in operative communication with an additional volume and in which the pressurized gas is transferred between the two chambers through a conventional orifice. Curve C represents the expected performance of a gas spring and confinement that are in fluid communication through a porous flow restrictor that is fluidically connected therebetween, in accordance with the present novel concept.

With more-specific reference to Curve A, the same includes certain regions or characteristics that will be discussed herein in greater detail. One such region starts at a zero or very low frequency of $f_0$ and is indicated in FIG. 3 by reference characters $A_1$. In this region, the curve has a relatively low slope that represents performance of the gas spring during which the spring rate does not substantially vary with the frequency of vibration. Curve A then begins to transition, beginning at about frequency $f_1$, to a peak $A_2$ that represents a first resonant frequency or harmonic, which is shown as occurring at about frequency $f_R$. It will be appreciated that the first resonant frequency of a conventional gas spring will vary from gas spring-to-gas spring, and that such a first resonant frequency is known to occur within a relatively wide range of frequencies, such as from about 150 Hz to about 300 Hz, for example.

As indicated above, curve B illustrates the reduced spring rate of a gas spring that is achieved through the use of an additional volume of pressurized gas with gas flowing between the additional volume and the gas spring through a conventional orifice. This reduction of the normal spring rate $SP_N$ to the lower spring rate $SP_1$ is represented in FIG. 3 by dimension $D_{SP}$. It will be recognized that this reduction in spring rate is shown on curve B in FIG. 3 as being at a maximum amount at about frequency $f_0$. As the frequency of vibration of the gas spring increases, however, the pressurized gas flowing between the gas chambers through the orifice begins to become stalled or choked. So, the effectiveness of the additional volume is immediately or almost immediately reduced, as is represented by the slope of curve B. Eventually, the gas flow through the orifice becomes fully choked and the additional volume becomes ineffective, as indicated by the merger of curve B with that of curve A at about frequency $f_2$.

Curve C illustrates the anticipated performance of a gas spring and an additional volume that are in fluid communication through a porous flow restrictor. A first region or portion $C_1$ of curve C extends in FIG. 3 from about zero frequency $f_0$ through about frequency $f_3$. This first region represents performance of the gas spring at about the same substantially decreased spring rate $SP_1$ as discussed above. However, it will be recognized that this substantially reduced spring rate is expected to be maintained over a considerably wider range of frequencies, such as from about frequency $f_0$ to about frequency $f_3$, as shown in FIG. 3, for example. By comparison, the spring rate at frequency associated with the orifice arrangement represented by curve B would, at frequency $f_3$, be expected to have increased significantly, whereas the spring rate of the subject arrangement is expected to remain at about spring rate $SP_1$. What's more, through frequency $f_2$ in FIG. 3 the spring rate represented by curve C is expected to be at or near the normal spring rate $SP_N$, which is significantly below the rate of a conventional spring and about the frequency at which the additional volume of an orifice-type arrangement would become wholly ineffective. Curve C is shown in FIG. 3 as finally merging with curve A at or about a frequency $f_4$.

In light of the foregoing, it is expected that a gas spring assembly having an additional volume of gas with a porous flow restrictor disposed in fluid communication between the spring chamber and the additional volume would be capable of providing a reduced spring rate (relative to that of the same gas spring without an additional volume) over a range of frequencies (e.g., frequency $f_0$ to frequency $f_4$ in FIG. 3) that is at least about 50 percent and possibly as much as 90 percent of the range of frequencies from at or near the zero frequency (e.g., frequency $f_0$ in FIG. 3) to the first resonant frequency (e.g., frequency $f_R$ in FIG. 3) of the gas spring. Additionally, it is expected that such a gas spring assembly would be capable of providing a reduced spring rate that is substantially independent of frequency of vibration over a range of frequencies (e.g., frequency $f_0$ to frequency $f_3$ in FIG. 3) that is at least 10 percent and possibly as much as 40 percent of the range of frequencies from at or near the zero frequency (e.g., frequency $f_0$ in FIG. 3) to the first resonant frequency (e.g., frequency $f_R$ in FIG. 3) of the gas spring.

Another aspect of such improved performance of the subject gas spring assembly involves the vibration damping capabilities that are generated by the subject construction having at least two gas chambers fluidically connected by at least one porous flow restrictor. Due at least in part to differential pressure between the gas chambers, the pressurized gas therein flows through the porous flow restrictor, which is disposed in the passage between the gas chambers. The porous restrictor element of the porous flow restrictor will normally include hundreds or thousands of gas flow passages and have many hundreds or thousands of times the surface area of a comparable orifice arrangement. As such, gas flowing through the porous restrictor element is capable of maintaining laminar flow properties under a wider range of operating conditions. Generally, laminar flow conditions are more predictable and may be used to more accurately target frequencies of vibration that are to be damped. Additionally, laminar gas flow can normally be initiated at lower differential pressures than may be required under turbulent gas flow conditions. As such, it is expected that a wider range of frequencies of vibration can be damped.

As used herein with reference to certain elements, components and/or structures (e.g., "first gas chamber," "second gas chamber," and "third gas chamber"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring and gas damper assembly for an associated vehicle having an associated sprung mass and an associated unsprung mass, said assembly comprising:

a first gas spring assembly operatively connected between the associated sprung and unsprung masses, said first gas spring including a first end member disposed toward the associated sprung mass, a second end member spaced from said first end member toward the associated unsprung mass, and a flexible spring wall secured between said first and second end members that at least partially defines a first gas chamber therebetween;

a first gas damper operatively connected to said gas spring assembly and including a first confinement that at least partially defines a second gas chamber having a substantially fixed volume and a first porous flow restrictor disposed in fluid communication between said first and second gas chambers, said first porous flow restrictor defining a plurality of fluid flow pathways establishing a first fluid flow rate of said first porous flow restrictor, and said first porous flow restrictor being operative to maintain laminar gas flow through said plurality of fluid flow pathways upon movement of said first and second end members relative to one another and to thereby dissipate kinetic energy associated with said gas spring assembly corresponding to a first range of frequencies of gas flow having a relation to said first fluid flow rate of said first porous flow restrictor; and, a second gas damper operatively connected to said gas spring assembly and including a second confinement that at least partially defines a third gas chamber having a substantially fixed volume and a second porous flow restrictor disposed in fluid communication between said first and third gas chambers, said second porous flow restrictor defining a plurality of fluid flow pathways establishing a second fluid flow rate of said second porous flow restrictor that is different from said first fluid flow rate of said first porous flow restrictor, and said second porous flow restrictor being operative to maintain laminar gas flow through said plurality of fluid flow pathways upon movement of said first and second end members relative to one another and to thereby dissipate kinetic energy associated with said gas spring assembly corresponding to a second range of frequencies of gas flow having a relation to said second fluid flow rate of said second porous flow restrictor such that said second range of frequencies of gas flow is different from said first range of frequencies of gas flow.

2. An assembly according to claim 1 further comprising a wall structure disposed adjacent one of said first porous flow restrictor and said second porous flow restrictor, said wall structure including an orifice fluidically connected in series with said one of said first porous flow restrictor and said second porous flow restrictor, said orifice operative to target a corresponding one of said first range of frequencies of gas flow between said first and second gas chambers and said second range of frequencies of gas flow between said first and third gas chambers.

3. An assembly according to claim 2 further comprising a valve assembly fluidically connected in series with said one of said first porous flow restrictor and said second porous flow restrictor and said orifice, said valve assembly operative to selectively control gas flow between a corresponding one of said first and second gas chambers through said first porous flow restrictor and said first and third gas chambers through said second porous flow restrictor and said orifice.

4. A gas spring and damper assembly according to claim 1, wherein said first gas spring has a spring rate that has a relation to said first gas chamber, said spring rate varying as a function of frequency of vibration and having a first resonant frequency; and, said second gas chamber and said first porous flow restrictor being operative to generate a reduced-spring rate region that is substantially independent of frequency of vibration through a range of frequencies below said first resonant frequency.

5. A gas spring assembly according to claim 4, wherein said first range of frequencies includes at least about 50 percent of a range of frequencies between about zero and about said first resonant frequency.

6. A gas spring assembly according to claim 1, wherein said first gas spring has a spring rate that has a first initial value and that varies as a function of frequency of vibration with a peak spring rate corresponding to a first resonant frequency; and, said second gas chamber and said first porous flow restrictor are operative to reduce said spring rate from said first initial value to a second, lower initial value for a first range of frequencies below said first resonant frequency.

7. A gas spring assembly according to claim 6, wherein said range of frequencies through which said reduced-spring rate region is substantially frequency independent is at least about 10 percent of range of frequencies between zero and said first resonant frequency.

8. An assembly according to claim 1 further comprising a valve assembly fluidically connected in series with one of said first porous flow restrictor between said first and second gas chambers and said second porous flow restrictor between said first and third gas chambers with said valve assembly operative to selectively control gas flow through said porous flow restrictor fluidically connected in series therewith.

9. A gas spring and gas damper assembly for an associated vehicle having an associated sprung mass and an associated unsprung mass, said assembly comprising:
a gas spring assembly dimensioned for operative connection between the associated sprung and unsprung masses, said first gas spring including a first end member, a second end member spaced from said first end member, and a flexible spring wall secured between said first and second end members that at least partially defines a first gas chamber therebetween; and,
a gas damper operatively connected to said gas spring assembly and including:
a first confinement that at least partially defines a second gas chamber having a substantially fixed volume;
a first porous flow restrictor disposed in fluid communication between said first and second gas chambers, said first porous flow restrictor including a plurality of fluid flow pathways establishing a first fluid flow rate through said first porous flow restrictor, said first porous flow restrictor being operative to dissipate kinetic energy associated with said gas spring assembly corresponding to a first range of frequencies of gas flow having a relation to said first fluid flow rate; and,
a second porous flow restrictor disposed in parallel fluid communication with said first porous flow restrictor between said first and second gas chambers, said second porous flow restrictor including a plurality of fluid flow pathways establishing a second fluid flow rate through said second porous flow restrictor, said second porous flow restrictor being operative to dissipate kinetic enemy associated with said gas spring assembly corresponding to a second range of frequencies of gas flow having a relation to said second fluid flow rate.

10. An assembly according to claim 9 further comprising a wall structure disposed adjacent one of said first and second porous flow restrictors and including an orifice fluidically connected in series with said one of said first and second porous flow restrictors, said orifice operative to target a corresponding one of said first range of frequencies and said second range of frequencies of gas flow between said first and second gas chambers.

11. An assembly according to claim 10, wherein said orifice is a first orifice and said wall structure includes a plurality of orifices each fluidically connected in series with one of said first and second porous flow restrictors with one orifice of said plurality of orifices operative to target said first range of frequencies of gas flow and another orifice of said plurality of orifices operative to target said second range of frequencies of gas flow.

12. An assembly according to claim 11 further comprising a valve assembly fluidically connected in series with one of said first and second porous flow restrictors and a corresponding one of said plurality of orifices, said valve assembly operative to selectively control gas flow therethrough.

13. An assembly according to claim 12, wherein said valve assembly is one of a plurality of valve assemblies, and each of said plurality of valve assemblies is fluidically connected in series with one of said first and second porous flow restrictors and a corresponding one of said plurality of orifices.

14. An assembly according to claim 9 further comprising a valve assembly fluidically connected in series with one of said first and second porous flow restrictors and operative to selectively control gas flow therethrough.

15. An assembly according to claim 14, wherein said valve assembly is one of a plurality of valve assemblies, and each of said plurality of valve assemblies is fluidically connected in series with one of said first and second porous flow restrictors such that said first and second porous flow restrictors can be selectively placed in fluid communication between said first and second gas chambers.

16. A suspension system for an associated vehicle having an associated sprung mass and an associated unsprung mass, said suspension system comprising:
a gas spring assembly operatively connected between the associated sprung and unsprung masses, said gas spring assembly including:
a first end member;
a second end member spaced from said first end member; and,
a flexible spring wall secured between said first and second end members that at least partially forms a first gas chamber therebetween;
a gas damper operatively disposed between the associated sprung and unsprung masses, said gas damper including:
a first confinement at least partially defining a second gas chamber having a substantially fixed volume;
a second confinement at least partially defining a third gas chamber having a substantially fixed volume;
a first porous flow restrictor disposed in fluid communication between said first and second gas chambers for dissipating kinetic energy associated with said suspension system, said first porous flow restrictor defining a plurality of fluid flow passages that establish a first flow rate through said first porous flow restrictor; and,
a second porous flow restrictor disposed in fluid communication between said first and third gas chambers for dissipating kinetic enemy associated with said suspension system, said second porous flow restrictor defining a plurality of fluid flow passages that establish a second flow rate through said second porous flow restrictor that is different from said first flow rate through said first porous flow restrictor such that at least one of said first and second porous flow restrictors is operative to maintain laminar gas flow under relative displacement between said first and second end members of said gas spring which generates gas flow between at least one of said first and second gas chambers through said first porous flow restrictor and said first and third as chambers through said second porous flow restrictor;
a pressurized gas source in fluid communication with at least one of said first, second and third gas chambers;

a valve assembly fluidically connected between said pressurized gas source and said at least one of said first, second and third gas chambers; and, a control system operative to selectively energize said valve assembly for controlling fluid communication between said pressurized gas source and said at least one of said first, second and third gas chambers.

17. A suspension system according to claim 16, wherein at least one of said first and second porous flow restrictors includes a porous element formed from a material selected from one of metal, plastic and ceramic.

18. A suspension system according to claim 17, wherein said at least one of said first and second porous flow restrictors includes a porous metal element formed of material selected from one of stainless steel, nickel alloy and nickel-molybdenum alloy.

19. A suspension system according to claim 16, wherein said gas spring is one of a plurality of gas springs operatively connected between the associated sprung and unsprung masses, said gas damper is one of a plurality of gas dampers operatively disposed between the associated sprung and unsprung masses with each of said plurality of gas dampers in operative association with one of said plurality of gas springs.

20. A suspension system according to claim 16, wherein said second end member of said gas spring includes an end member wall that at least partially forms said first confinement such that said second gas chamber is at least partially disposed within said second end member.

21. A suspension system according to claim 16, wherein said gas damper includes first and second valves that are fluidically connected in series with a respective one of said first and second porous flow restrictors.

22. A suspension system according to claim 16, wherein said gas damper includes a wall structure disposed adjacent one of said first and second porous flow restrictors, said wall structure including an orifice connected in series with said one of said first and second porous flow restrictors, said orifice dimensioned to target a range of frequencies of gas flow corresponding one of said first and second flow rates.

23. A method of making a gas spring and gas damper suspension system for a vehicle having a sprung mass and an unsprung mass, said method comprising:

a) disposing a first gas-filled confinement that has a first gas chamber with a substantially fixed volume and a second gas-filled confinement that has a second gas chamber with a substantially fixed volume on said vehicle;

b) disposing a gas spring having a third gas chamber on said vehicle by securing a first portion of said gas spring along said sprung mass and securing a second portion of said gas spring along said unsprung mass of said vehicle;

c) forming a first passage fluidically connecting said first and third gas chambers and a second passage fluidically connecting said second and third gas chambers; and, d) disposing a first porous flow restrictor in said first passage such that laminar gas flow travels through said first passage at a first flow rate and disposing a second porous flow restrictor in said second passage such that laminar gas flow travels through said second passage at a second flow rate that is different from said first flow rate with said laminar gas flow being due at least in part to relative displacement of said first and second spring portions of said gas spring and with said first flow rate having a relation to a first range of frequencies of gas flow and said second flow rate having a relation to a second range of frequencies of gas flow that is different from said first range of frequencies.

24. A method according to claim 23, wherein c) includes forming a plurality of second passages fluidically connecting said second and third gas chambers, and d) includes disposing a porous flow restrictor in two or more of said plurality of passages.

25. A method according to claim 23 further comprising disposing a valve assembly in fluid communication along one of said first and second passages that is capable of controlling gas flow through said one of said first and second passages and a corresponding one of said first and second porous flow restrictors.

26. A method according to claim 23 further comprising disposing a wall structure in spaced relation to one of said first and second porous flow restrictors, said wall structure including an orifice in fluid communication with a corresponding one of said first and second passages.

* * * * *